UNITED STATES PATENT OFFICE.

JAMES EDWIN FAIRFAX, OF AIKEN, SOUTH CAROLINA, ASSIGNOR OF ONE-HALF TO DAVID WILLIAM GASTON, JR., OF AIKEN, SOUTH CAROLINA.

WALL-PLASTER.

1,269,695.  Specification of Letters Patent.  Patented June 18, 1918.

No Drawing.  Application filed August 18, 1917. Serial No. 186,959.

*To all whom it may concern:*

Be it known that I, JAMES EDWIN FAIRFAX, a citizen of the United States, and a resident of Aiken, in the county of Aiken and State of South Carolina, have invented a new and Improved Wall-Plaster, of which the following is a full, clear, and exact description.

My invention has reference to a composition of matter which forms a wall plaster or stucco.

The object of the invention is to provide an inexpensive plaster which is fire- and waterproof, which will not peal off, and which will give a very smooth-finish surface.

The base of the plaster is tripoli, which is as cheap as, if not cheaper than, sand. Being very fine it permits the formation of a very smooth surface.

The tripoli must be fully dried before the plaster is formed. To the tripoli cement is added, preferably, Portland cement, fibrous material to increase the binding quality of the plaster, preferably mineral wool being used, and light bluestone $CuSO_4.5H_2O$, to accelerate the setting and prevent efflorescence. It is a well known fact that if copper sulfate, which normally contains five particles of water, is heated it loses its water of crystallization and even that of constitution. Roasted copper sulfate when moistened becomes very hot and tends to assume its original color, that is, absorbs or accumulates the water of crystallization. This peculiar faculty of copper sulfate is utilized in this composition to facilitate the setting of same. The above ingredients are used in substantially the following proportions:

| | | |
|---|---|---|
| Tripoli | 1500 pounds | or 74.77% |
| Portland cement | 500 " | or 24.92% |
| Mineral wool | 6 " | or .30 |
| Bluestone (preferably roasted) | 1 ounce | or .01 |

The dry tripoli, Portland cement, mineral wool and bluestone are placed in a dry mixture and mixed for from five to ten minutes and then put in bags ready for shipping.

The tripoli is like very fine sand, and owing to its fine flour-like state it gives to the mortar what the plasterers call "a long stroke" and makes the mortar work easily and it does not waste. It is fire- and waterproof. The Portland cement causes the hardening of the mass. The mineral wool also helps to harden the mass and binds it, as it may be said, to form a very thin skeleton in the body of the plaster.

This plaster sets in a reasonable time in very cold weather, which makes it very useful for exterior wall plastering.

If the composition is to be used as a stucco, the first coat should be put on good and heavy; it should be well scratched, and then dried out fully before putting the second coat on. The second coat must also be heavy, well rodded, darbed, and floated. The last coat is finished either with a trowel or float. For the last coat it is preferable to use Atlas White Portland cement in place of ordinary cement, the proportions remaining the same.

While I have given relative proportions of the ingredients used for making the plaster or stucco, I do not want to be limited to those proportions, as slight variations in the proportions may be made without materially affecting the efficiency of the composition.

I claim:

1. A plaster consisting of a mixture of tripoli, cement, mineral wool, and bluestone, in proportions substantially as specified.

2. A plaster consisting of a mixture of Portland cement, tripoli, mineral wool, and roasted bluestone, in proportions substantially as specified.

3. A plaster consisting of a mixture of tripoli, a binder, fibrous substance, and roasted bluestone in proportions substantially as specified.

4. A plaster consisting of a mixture of infusorial silica, cement, mineral wool, and copper sulfate in proportions substantially as specified.

JAMES EDWIN FAIRFAX.

Copies of this patent may be obtained for five cents each, by addressing the "Commissioner of Patents, Washington, D. C."